(12) United States Patent
Harben, III (10) Patent No.: US 8,968,060 B2
(45) Date of Patent: Mar. 3, 2015

(54) AUTOMATED POULTRY HANGING SYSTEM AND METHOD

(76) Inventor: Grover S. Harben, III, Gainesville, GA (US)

( * ) Notice: Subject to any disclaimer, the term of this patent is extended or adjusted under 35 U.S.C. 154(b) by 424 days.

(21) Appl. No.: 13/539,384

(22) Filed: Jun. 30, 2012

(65) Prior Publication Data

US 2013/0005230 A1 Jan. 3, 2013

Related U.S. Application Data

(60) Provisional application No. 61/502,934, filed on Jun. 30, 2011.

(51) Int. Cl.
*A22C 25/08* (2006.01)
*A22C 21/00* (2006.01)

(52) U.S. Cl.
CPC ......... *A22C 21/0053* (2013.01); *A22C 21/0007* (2013.01); *A22C 21/0015* (2013.01)
USPC ........................................................ 452/180

(58) Field of Classification Search
None
See application file for complete search history.

(56) References Cited

U.S. PATENT DOCUMENTS

| | | | | |
|---|---|---|---|---|
| 2,617,145 A * | 11/1952 | Davis | ............................ | 452/90 |
| 2,817,874 A * | 12/1957 | Conaway | ..................... | 452/106 |
| 4,876,767 A * | 10/1989 | Harben, III et al. | .......... | 452/106 |
| 5,134,971 A * | 8/1992 | Krienke et al. | ............... | 119/713 |
| 6,623,346 B2 * | 9/2003 | Lee | ................................. | 452/53 |
| 7,597,615 B2 * | 10/2009 | van den Nieuwelaar et al. | ............................ | 452/182 |
| 8,105,138 B2 * | 1/2012 | Van Den Nieuwelaar et al. | ............................ | 452/177 |

* cited by examiner

*Primary Examiner* — Richard Price, Jr.
(74) *Attorney, Agent, or Firm* — FisherBroyles, LLP (57) ABSTRACT

This invention relates to automated systems and methods for hanging live poultry for further processing. The system has an alignment conveyor, an alignment stunner, a hanging box, and a shackle. The alignment conveyor conveys poultry from an input point to the alignment stunner. The alignment stunner urges the poultry to move to a desired position on the alignment conveyor and stuns the poultry. The hanging box grasps the stunned poultry and places the poultry into the shackle for further processing. A computer and at least one sensor control operation of the system so that human intervention is minimized.

20 Claims, 7 Drawing Sheets

AUTOMATED POULTRY HANGING SYSTEM AND METHOD

CROSS-REFERENCE TO RELATED PATENT APPLICATION

This application claims the benefit of and priority to U.S. Patent Application No. 61/502,934 filed on Jun. 30, 2011, which is hereby incorporated by reference in its entirety.

FIELD OF THE INVENTION

This invention relates to systems and methods for hanging live poultry. More particularly, this invention relates to automated systems and methods for hanging live poultry for processing.

BACKGROUND OF THE INVENTION

Poultry processing plants have become automated to a large extent. Due to Federal regulations, it is necessary to kill the birds while they are in an inverted configuration, so that the blood is pumped from the birds' body via their own heart. Typically, birds are processed in an inverted position with their hocks suspended by shackles pivotally mounted to an overhead conveyor line. This orientation places the tail region roughly midway down the bird body while the pivotal mounting enables the birds to be manipulated along the process line. It is common practice to electrically stun the birds prior to processing them while they are inverted and shackled. In this manner, the birds, while alive, remain relatively motionless for processing.

Conventionally, suspending the bird from the shackles is a manual process. For example, depending on the speed to the overhead conveyor line, several employees can be required to restrain the bird, orient the bird correctly relative to the shackles of the conveyor, and place the bird into the shackles. Because the birds are alive, manually loading the birds into the shackles can be a cumbersome and unsanitary task. Therefore, there is a need in the industry for a system or apparatus to automatically hang live poultry for processing. The present invention fulfills these needs and provides further related advantages as describe herein.

SUMMARY

The application relates to systems and methods for automatically hanging live poultry, such as a chicken, quail, turkey, duck and the like. In one aspect, the system for hanging live poultry can comprise at least one of an alignment conveyor, an alignment stunner, a rain stunner, a hanging box, and a shackle. The alignment conveyor can convey poultry from an input point in the processing facility to the alignment stunner. In another aspect, the alignment stunner can urge the poultry to move to a desired position on the alignment conveyor. In still another aspect, the alignment and/or the rain stunner can stun the poultry while the poultry is in the desired position. In another aspect, the hanging box can grasp the stunned poultry and place the poultry into the shackle for further processing. In one aspect, it is contemplated that a computer can be configured to control operation of the system so that human intervention is minimized. The system can also comprise at least one sensor that is operatively coupled to the computer.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE FIGURES

These and other features of the preferred embodiments of the invention will become more apparent in the detailed description in which reference is made to the appended drawings wherein.

DETAILED DESCRIPTION OF THE INVENTION

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a hanging box" can include two or more such hanging boxes unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Figure 1:
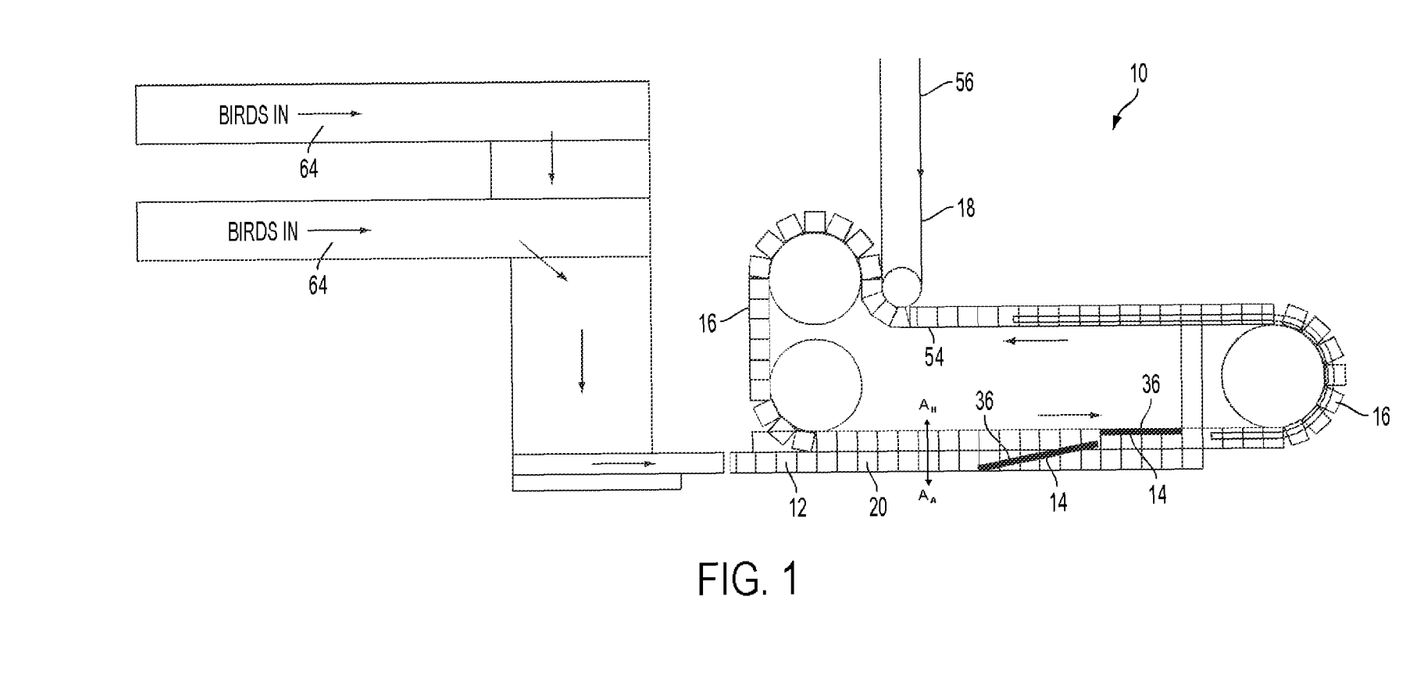
FIG. 1 is a schematic diagram of an automated system for hanging live poultry, according to one aspect.

The application relates to systems and methods for automatically hanging live poultry, such as a chicken, quail, turkey, duck and the like. In one aspect, as illustrated in FIG. 1, the system 10 for hanging live poultry can comprise at least one of an alignment conveyor 12, an alignment stunner 14, a hanging box 16, and a shackle 18. As will be described more fully below, the alignment conveyor and/or the alignment stunner can urge the birds to face a predetermined direction. The hanging box can then grasp the bird and place it in the shackle for further processing.

Figure 2:
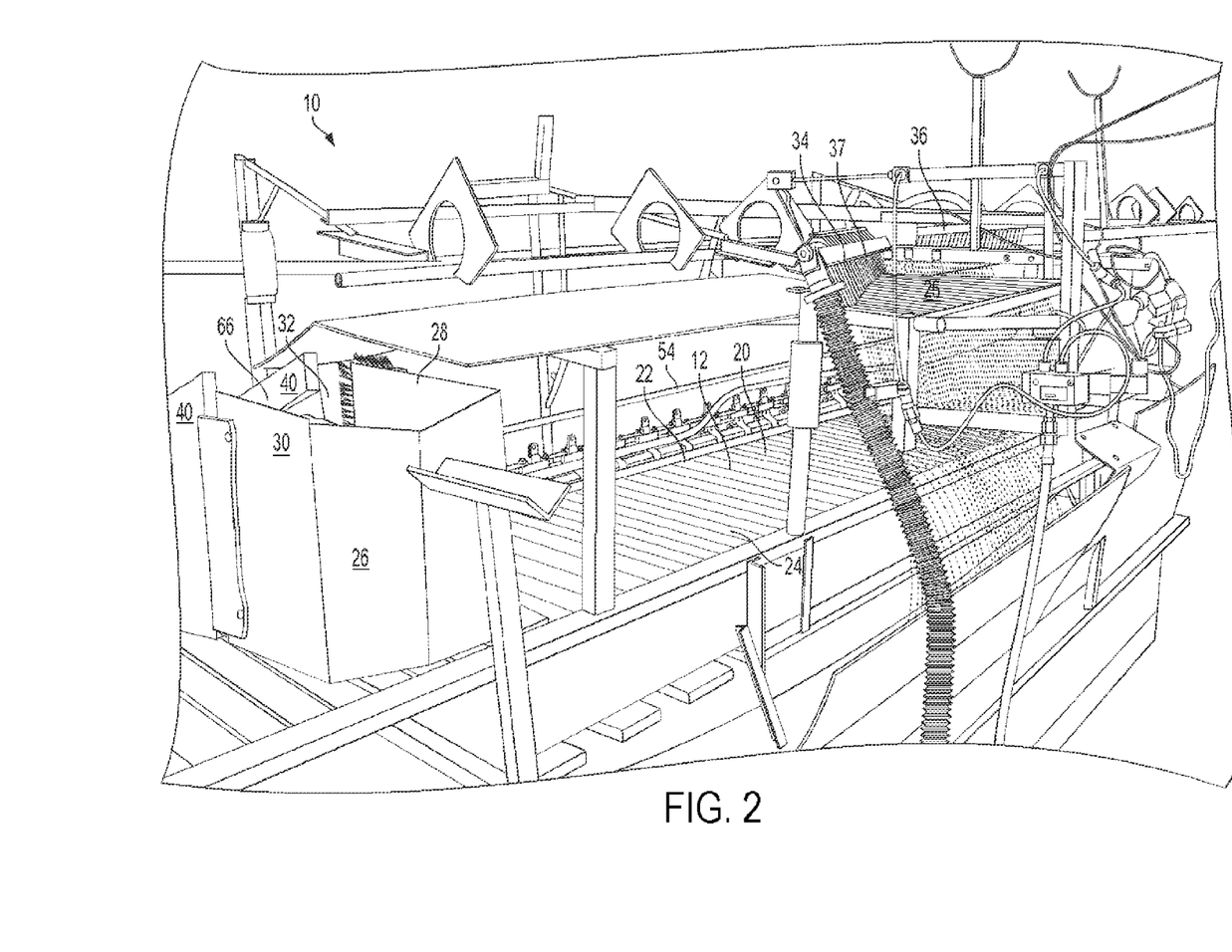
FIG. 2 is a perspective view a portion of the system of FIG. 1.

In one aspect, the alignment conveyor 12 can be an endless conveyor that can be conventionally trained around a plurality of conveyor rollers. It is contemplated that the endless conveyor can comprise a conventional design. In one non-limiting example, at least one of the conveyor rollers can be driven by a motor or drive, which causes the alignment conveyor to rotate about the conveyor rollers at a desired and selectable alignment conveyor speed in an alignment conveyor direction. As illustrated in FIG. 2, in another aspect, during at least a portion of the course of the endless conveyor path, at least a portion of the alignment conveyor 12 direction can be substantially linear along an alignment conveyor axis. In yet another aspect, during at least a portion of the course of the endless conveyor path, an upper surface 20 of the alignment conveyor can be positioned in a conveyor plane that is substantially parallel to a floor on which the alignment conveyor is placed. Optionally, during at least a portion of the course of the endless conveyor path, the conveyor plane can be positioned at an acute angle relative to the floor on which the alignment conveyor 12 is placed. For example, a first side 22 of the alignment conveyor can be higher than a second side 24 relative to the floor.

Still with reference to FIG. 2, the alignment conveyor 12 can comprise at least one alignment box 26 comprising a first portion 28 and a separate second portion 30. In one aspect, the first portion and the second portion of the alignment box can be fixedly attached to and/or formed on portions of the upper surface 20 of the alignment conveyor such that the first and second portions 28, 30 of the alignment box extend upwardly away from the conveyor plane of the alignment conveyor. In another aspect, when the first and second portions of the alignment box 26 are on the upper surface 20 of the alignment conveyor 12, the first and second portions can form an enclosure 32 defining a side opening. As can be appreciated, it is contemplated that respective portions of the alignment box 26 can be formed from separate pieces so that the portions of the alignment box can separate or otherwise segment apart as respective portions of the upper surface of the alignment conveyor move relative to each other during the course of the movement of the alignment conveyor around the conveyor rollers. In still another aspect, and without limitation, the enclosure formed by the first and second portions 28, 30 of the alignment box can be substantially square or rectangular in cross-sectional shape. For example, the area formed by the enclosure can be approximately 12 inches by 12 inches, though other size and shape enclosures are of course contemplated.

In one aspect, the downstream alignment stunner 14 can define at least one opening and/or comprise at least nozzle 34 in fluid communication with a fluid source that is configured to direct a first stream of fluid in a desired direction. For example, the alignment stunner can be a poultry ("rain") stunner as described in U.S. Pat. No. 7,740,527, incorporated herein by reference in its entirety. In another aspect and as illustrated in FIG. 2, the alignment stunner comprises at least one first opening and/or nozzle 34 that is configured to direct a first stream of fluid into at least a portion of the alignment box 26 and/or the upper surface 20 of the alignment conveyor 12. As can be appreciated, there can be a plurality of openings and/or nozzles in fluid communication with the fluid source that are configured to direct at least a first stream of fluid into at least a portion of the of the alignment box and/or the upper surface of the alignment conveyor. The first opening and/or nozzle 34 can be coupled directly to the fluid source, or they can be connected to several distinct fluid sources. It is also contemplated that the alignment stunner 14 can comprise a manifold or at least one spray bar 36, which is coupled to the fluid source and feeds the plurality of first openings and/or nozzles defined in the spray bar. In one aspect, the plurality of openings and/or nozzles 34 of the spray bar 36 can be configured to allow fluid to exit the spray bar in a desired direction and flowrate. In another aspect, the openings and/or nozzles of the spray bar can be evenly spaced along the length of the spray bar such that a plurality of streams 37 of fluid exit the spray bar 36 in the desired direction and flowrate.

In one aspect, the alignment stunner can further comprise a screen or slotted cover 25 configured to allow the fluid to pass through the cover, while forcing the poultry to position its head below the cover. For example, the cover 25 can define a plurality of slots, each slot aligned with an opening or nozzle 34 of the alignment stunner such that fluid directed from each nozzle passes through the slot before contacting the poultry.

In one aspect, the spray bar 36 can be an oscillating spray bar, capable of rotation about and between a first spray bar position, in which fluid exits the spray bar in a first desired direction relative to the conveyor plane of the alignment conveyor 12, and a second spray bar position, in which fluid exits the spray bar in a second desired direction (different from the first desired direction) relative to the conveyor plane of the alignment conveyor. In the first desired direction, the plurality of streams 37 of fluid contact the alignment conveyor 12 generally about the second side 24 of the alignment conveyor and, in the second desired direction, the plurality of streams 37 of fluid contact the alignment conveyor 12 generally away from the second side of the alignment conveyor. Thus, in operation, when the spray bar rotates from the first spray bar position to the second spray bar position, the plurality of streams 37 of fluid contacting the alignment conveyor 12 moves from the second side 24 of the alignment conveyor 12 and towards the first side 22 of the alignment conveyor.

Referring again to FIG. 1, when viewed from above, the spray bar 36 of the alignment stunner 14 can be positioned at an acute angle relative to the alignment conveyor axis. In this aspect, the flow of fluid from the alignment stunner can progressively urge the bird from the alignment conveyor 12 toward the articulated hanging box 16. Alternatively, the spray bar of the alignment stunner can be positioned substantially parallel to the alignment conveyor axis.

Optionally, in one aspect and as shown in FIG. 1, the alignment stunner 14 can comprise a plurality of spray bars 36. In this aspect, a first spray bar of the plurality of spray bars can be positioned at an acute angle relative to the alignment conveyor axis and a second spray bar of the plurality of spray bars can be positioned substantially parallel to the axis of the alignment conveyor 12. It is of course contemplated that any number of spray bars can be positioned substantially parallel to the alignment conveyor axis or at an acute angle relative to the alignment conveyor axis. It is also contemplated that at least one spray bar can be a conventional spray bar for spraying a fluid, and at least one spray bar can be a spray bar electrically coupled to a power source as described in U.S. Pat. No. 7,740,527. In another aspect, at least one spray bar can comprise a constant current power supply configured to regulate the amount of electrical current directed to each bird at a predetermined current level.

Figure 3:
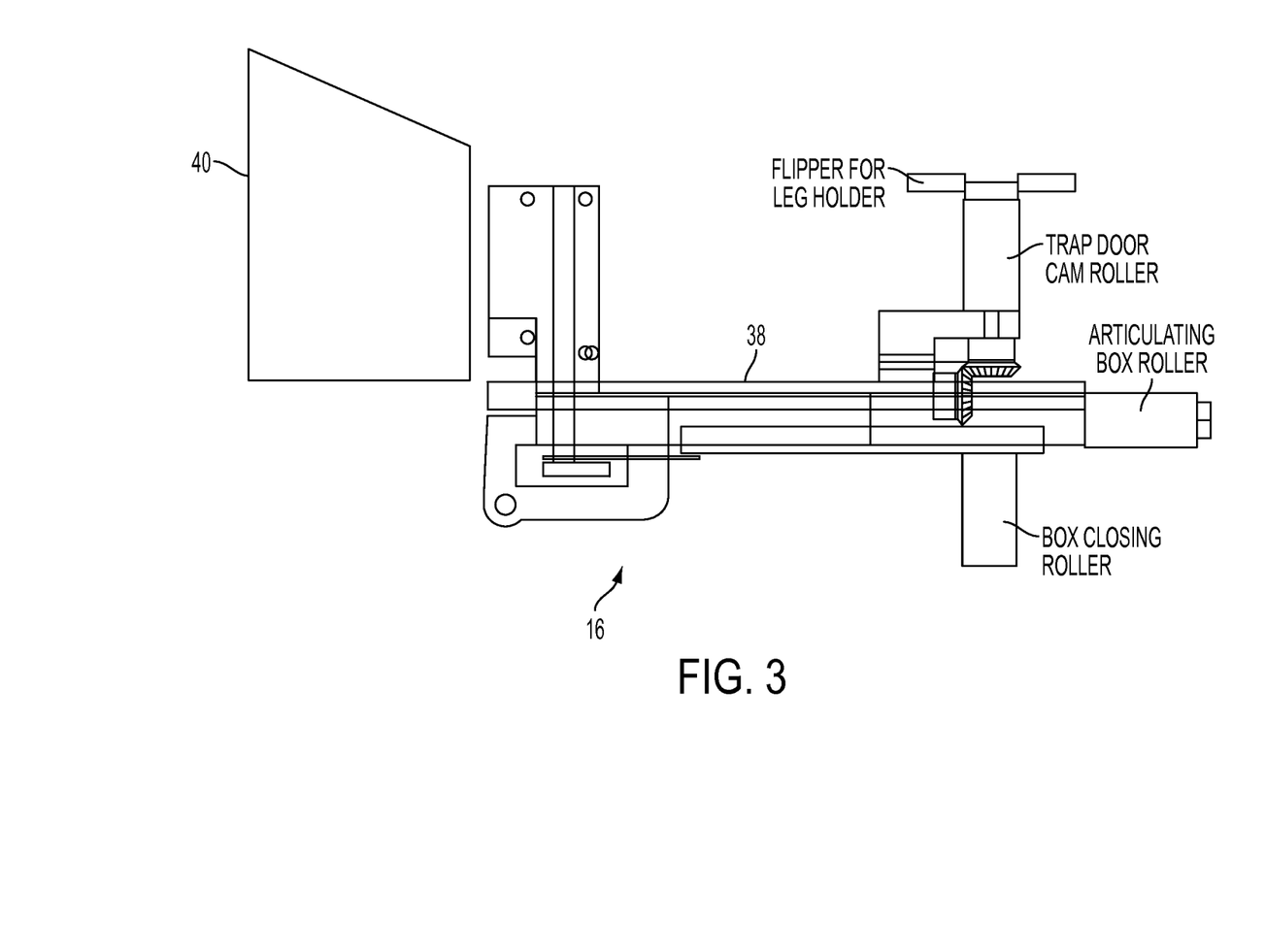
FIG. 3 is a cross-sectional side view of a hanging box of the system of FIG. 1.
Figure 4:
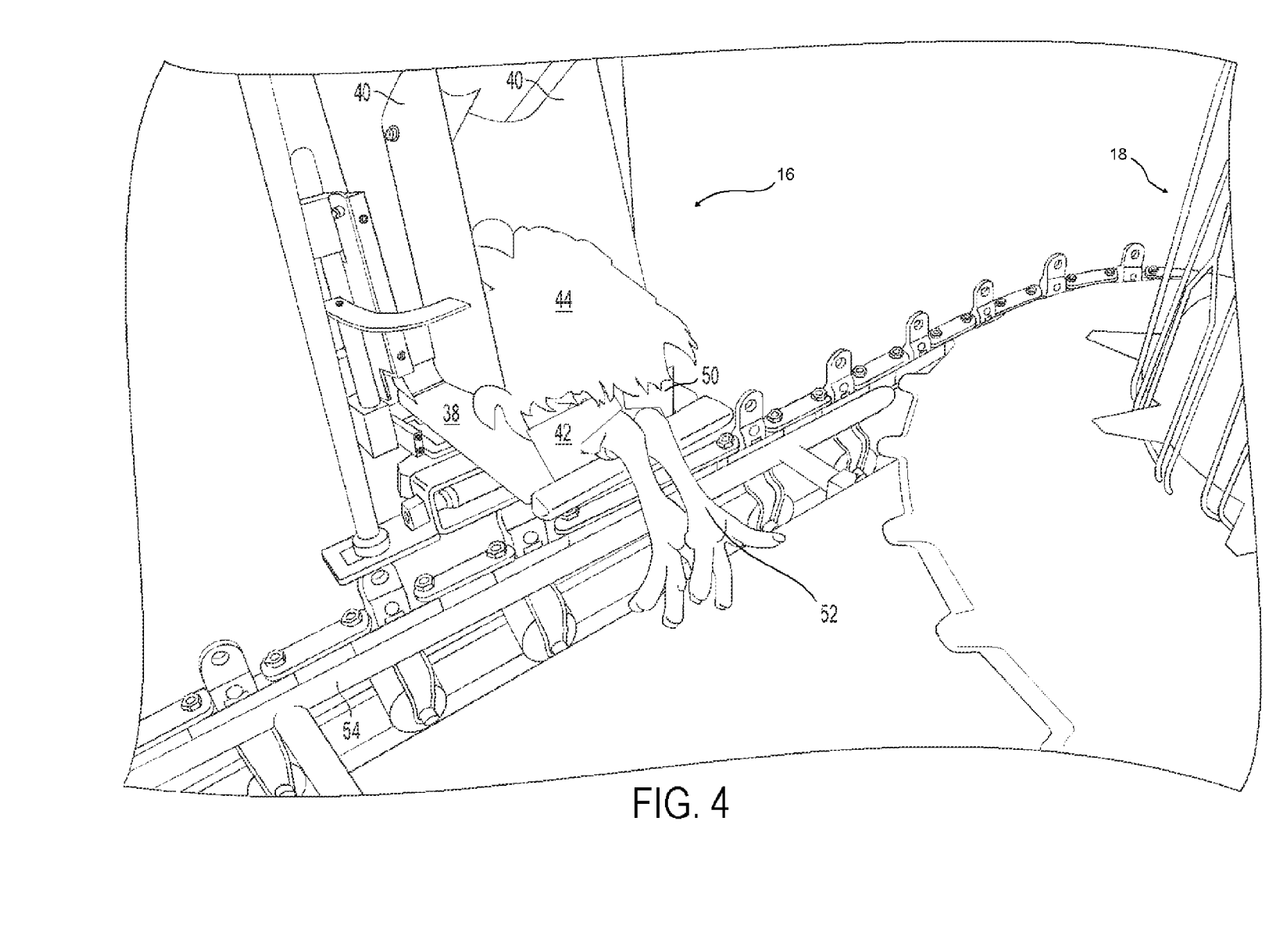
FIG. 4 is a perspective view of the hanging box of FIG. 3, showing a bird being grasped by the hanging box.
Figure 7:
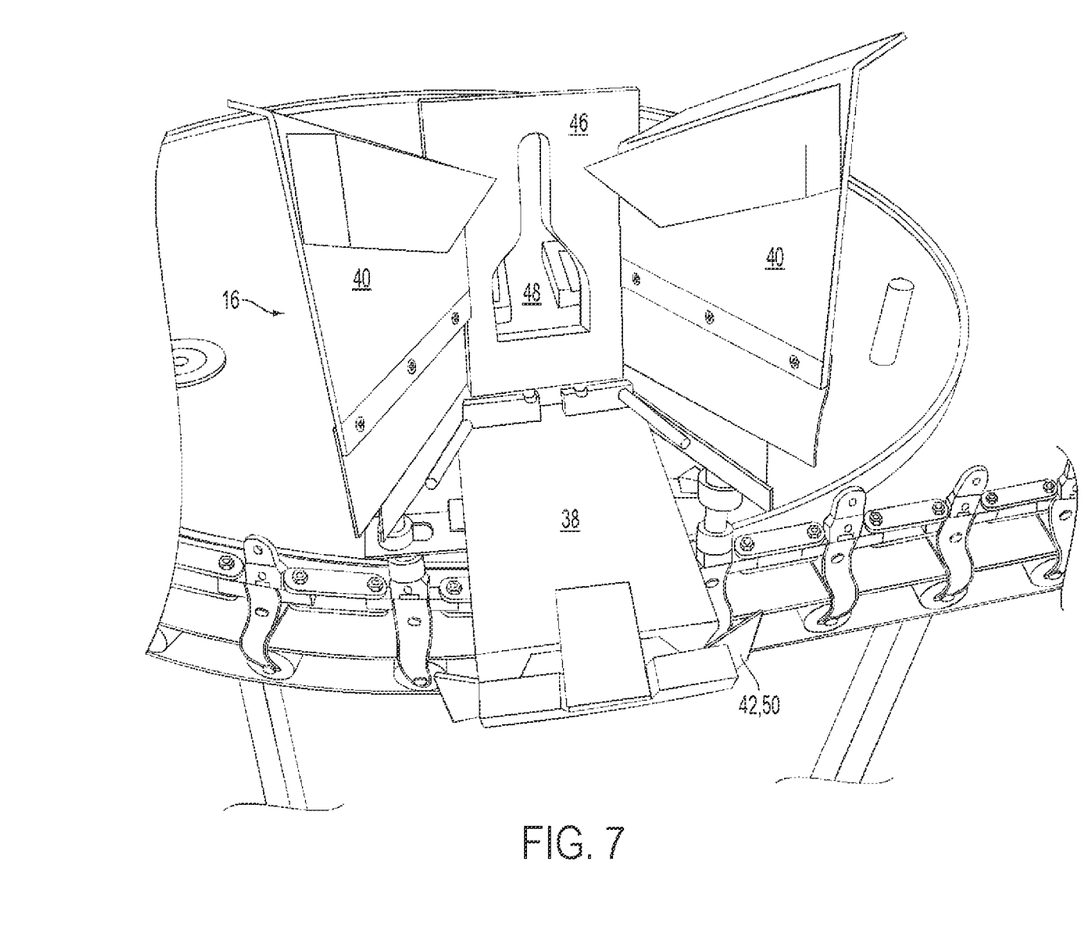
FIG. 7 is a perspective view of the hanging box of FIG. 3.

The hanging box 16 is illustrated in FIGS. 3, 4 and 7. In one aspect, the hanging box can comprise a lower surface 38, a pair of opposed sides 40, a means for immobilizing 42 the bird 44, and a rear wall 46 defining a rear wall aperture 48. In another aspect, the pair of opposed sides can be movable sides extending away from the lower surface. In still another aspect, the pair of opposed sides can be movable about and between a first side position, in which the pair of opposed sides are spaced from each other a first predetermined distance, and a second side position in which the pair of opposed sides are spaced from each other a second predetermined distance that is less than the first predetermined distance. Thus, in this aspect, the distance between the opposed sides 40 can vary. For example, the distance between the opposed sides can be greater than 12 inches, about 12 inches, 11 inches, 10 inches, 9 inches, 8 inches, 7 inches, 6 inches, 5 inches, 4 inches, 3 inches, 2 inches, 1 inch, less than 1 inch, or any distance in between as desired. In another aspect, the lower surface 38 can be sized so that the legs 52 of the bird extend beyond the lower surface 38 when the bird is grasped by the hanging box, as shown in FIG. 4 and described more fully below.

The means for immobilizing 42 the bird 44 can be comprise a means for immobilizing the legs 52 of the bird. In one aspect, the means for immobilizing the bird can comprise a pair of locking arms 50. Optionally, each locking arm of the pair of locking arms can be substantially L-shaped, substantially J-shaped, triangularly-shaped and the like. In one aspect, the locking arms can be movable about and between a first arm position, in which at least a portion of each locking arm is positioned below the lower surface 38 of the hanging box 16, and a second arm position in which at least a portion of each locking arm is positioned above the lower surface. In the second arm position, a notch and/or portion of the locking arm 50 can at least partially surround the leg 52 of the bird 44, thereby holding the bird in place on the lower surface of the hanging box.

In one aspect, the hanging box 16 can be an articulated hanging box, capable of rotating about and between a first box position, in which the lower surface 38 of the hanging box is substantially parallel to the plane of the alignment conveyor 12, and a second box position, in which the lower surface of the hanging box 16 is at an acute angle relative to the plane of the alignment conveyor. In another aspect, the lower surface of the hanging box can be movable from a first surface position in which the lower surface of the hanging box is substantially parallel to the floor of the processing facility and a second surface position in which the lower surface 38 is at an acute angle relative to the floor of the processing facility. In this aspect, in the first surface position, a portion of the lower surface can extend beyond the edge of the opposed sides 40 of the hanging box, illustrated in FIG. 4. In the second surface position, a portion of the lower surface 38 can be moved so that the lower surface 38 does not extend beyond the edge of the opposed sides of the hanging box 16, as illustrated in FIG. 5.

Referring again to FIG. 2, the hanging box 16 can be guided through the processing facility with at least one rail and/or chain 54. In one aspect, at least a portion of the at least one rail and/or chain can be positioned substantially parallel to the alignment conveyor 12, and at least a portion of the at least one rail and/or chain can be positioned adjacent to a conventional picking line 56 (as shown in FIG. 1) configured to move the plurality of shackles 18 through the processing facility. In another aspect, when the hanging box is positioned substantially parallel to the alignment conveyor 12, at least a portion of the lower surface 38 of the hanging box 16 can at least partially overlie the upper surface 20 of the alignment conveyor. As can be appreciated, conventional gears, motors, cams, and the like can be utilized to urge movement of the hanging box 16 as desired. In another aspect, the hanging box can move at a hanging box speed that is substantially the same as the alignment conveyor speed.

Figure 5:
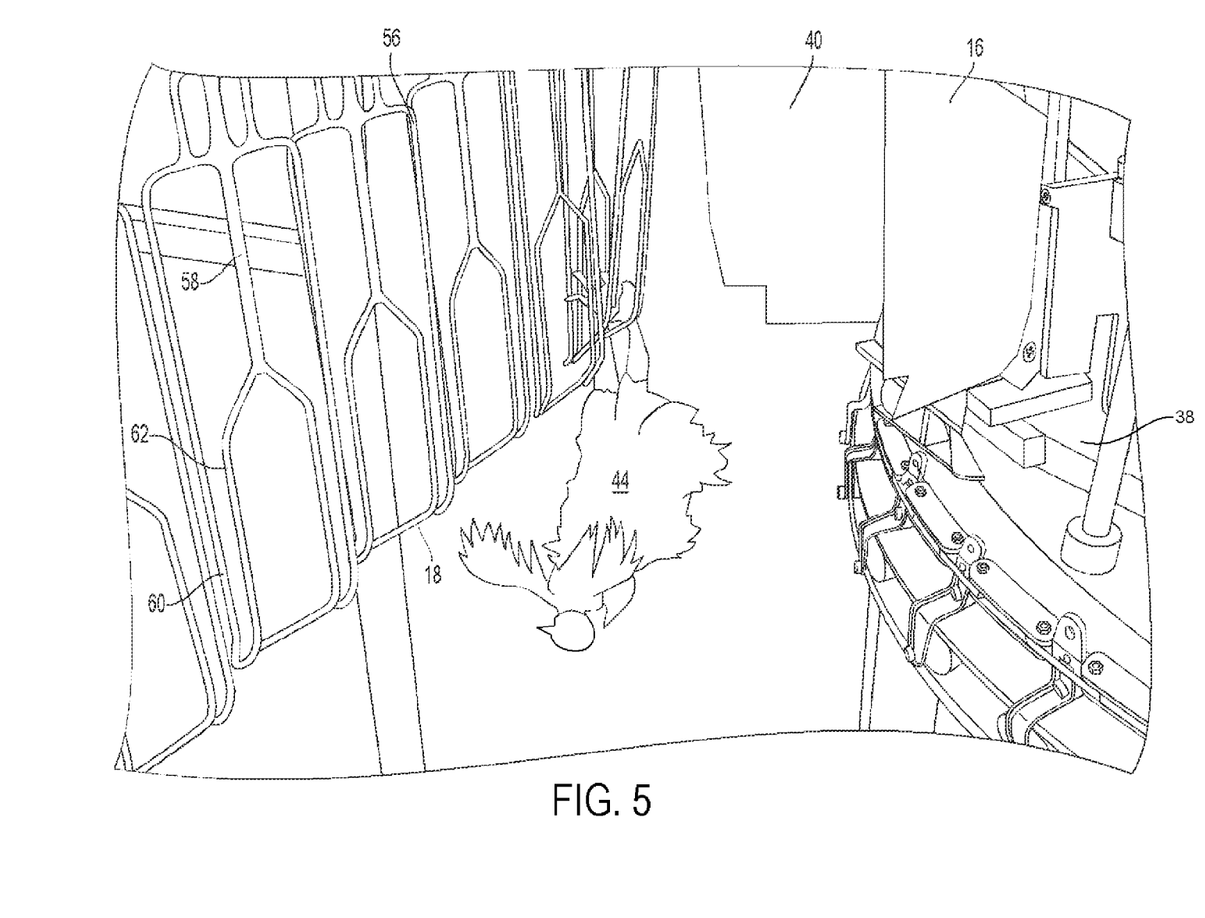
FIG. 5 is a perspective view of a shackle of the system of FIG. 1, showing a bird hanging from the shackle.
Figure 6:
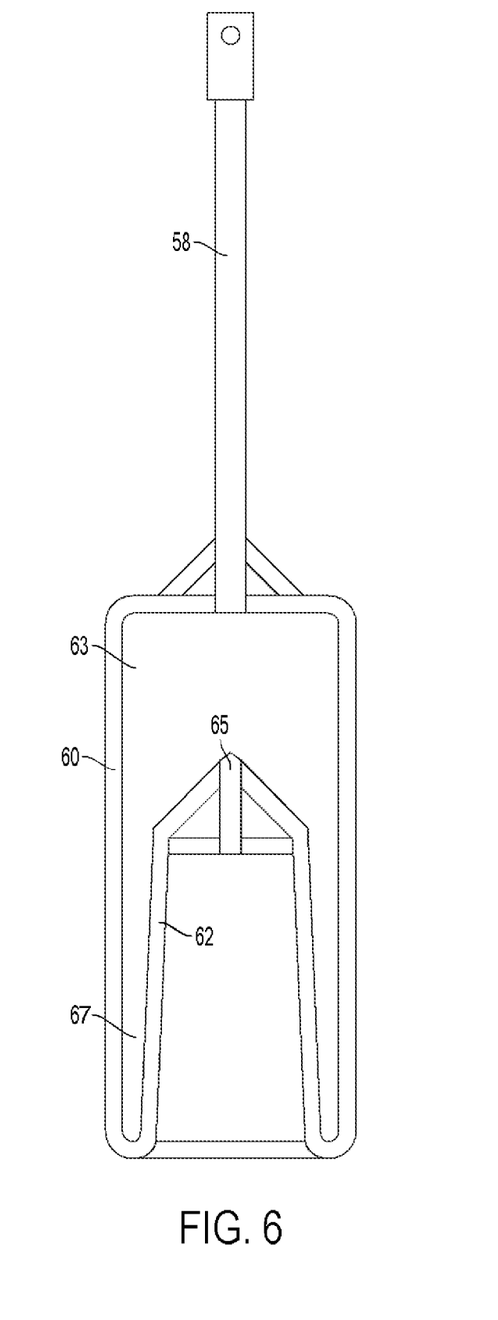
FIG. 6 is a side elevational view of a shackle, according to one aspect.

The shackle 18 is illustrated in FIGS. 5 and 6, according to various aspects. In one aspect, the shackle can comprise a central member 58 and an outer perimeter member 60. As illustrated in FIG. 6, a proximal end of the central member 58 can be attached to the outer perimeter member 60, and a distal end of the central member can extend away from the perimeter member and can be configured for attachment to a picking line. Two inner members 62 can be spaced from the outer perimeter member and can cooperate with the outer perimeter member 60 to create a pair of slots 67. In another aspect, at least a portion of the inner members can taper towards the outer perimeter member. In still another aspect, at least a portion of the inner members can be spaced from the outer perimeter member a predetermined distance so that the slots are sized to receive the legs of the bird. In one aspect, a central cavity 63 can be defined by a portion of the outer perimeter member, the central cavity being configured to allow the legs of the bird to be inserted into the shackle 18. In another aspect, the shackle can further comprise a roller and/or a slide 65. The roller and/or slide can be configured to matingly engage a groove defined in the hanging box 16 to improve alignment of the shackle 18 and the hanging box.

In one aspect, the system 10 can further comprise at least one scale and/or load cell configured to weigh each bird. For example, each shackle 18 could be coupled to a scale. In another aspect, the system can further comprise a control system such as a computer and/or processor coupled to at least one sensor and/or the at least one scale. In this aspect, the at least one sensor can be configured to sense the presence and/or position of a bird. Thus, for example, the sensor can sense the presence of a bird in an alignment box 26 and the computer can speed up or slow down the speed of the alignment conveyor 12, the hanging box 16 and/or the speed at which the shackle 18 is moving based at least in part upon the presence of the poultry. In other aspects, the at least one sensor can sense the location and/or position of the alignment conveyor, the alignment stunner, the hanging box, the shackle, and their respective components. The computer can be programmed to take predetermined actions based upon the readings received from the at least one sensor.

The system 10 for hanging live poultry can be formed from conventional materials, such as for example and without limitation, polymeric materials and/or stainless steel.

In order to use the system 10 for hanging live poultry, it is contemplated that the birds can be fed to the alignment conveyor 12 by conventional means. For example and without limitation, the birds can be loaded from delivery trucks into a hopper or other storage device. The hopper can, for example and referring again to FIG. 1, feed or otherwise urge the birds to a filing conveyor 64 which can move the birds to the alignment conveyor. Optionally, it is contemplated that the birds can be fed directly to the alignment conveyor 12 without the need for a hopper and/or the filing conveyor.

As the birds are urged onto the alignment conveyor 12, the first portion 28 of the alignment box 26 can extend upwards from the alignment conveyor preventing the bird from walking on the alignment conveyor past the first portion. The alignment conveyor can have a predetermined speed that can be adjusted manually and/or automatically based on factors such as the number of poultry to be processed, the size of the poultry and the like. As the alignment conveyor travels in the alignment conveyor direction towards the alignment stunner 14, the second portion 30 of the alignment box can rotate to a position behind the bird, thereby enclosing the bird in the enclosure 32 having a side opening.

In one aspect, a hanging box 16 can have a predetermined speed and can be positioned so that the pair of opposed sides 40 of the hanging box are adjacent the enclosure 32 of the alignment box 26 and are substantially aligned with the first and second portions 28, 30 of the alignment box as the alignment box travels in the alignment conveyor direction. For example and with reference to FIG. 1, a hanging box axis $A_H$ can be substantially coaxially aligned with an alignment box axis $A_A$ for a predetermined amount of time and/or a predetermined distance as the alignment box travels in the alignment conveyor direction. The hanging box speed and direction can be substantially the same as the alignment conveyor speed and direction so that the alignment box and the hanging box are positioned adjacent each other for a predetermined amount of time. Thus, as illustrated in FIG. 2, the opposed sides 40 of the hanging box and the first and second portions 28, 30 of the alignment box can cooperate to form a substantially enclosed area 66 for the bird, except for the rear wall aperture 48 defined in the rear wall 46 of the hanging box 16.

The substantially enclosed area 66 can then travel toward the alignment stunner 14 with the bird 44 enclosed therein. Because poultry by nature do not like to be sprayed with a fluid, such as water, birds will turn away from a fluid source and can attempt to walk away from the fluid source. If the fluid is electrified or if the fluid is cold, the birds can attempt to walk away from the fluid source more quickly. As the substantially enclosed area 66 travels under the spray bar 36 of the alignment stunner 14, the angle of the spray bar relative to the alignment conveyor direction and/or the oscillation of the spray bar can cause the bird to walk or be urged towards the first side 22 of the alignment conveyor 12 and into the hanging box 16. In a further attempt to avoid the water, the bird can insert his head into the rear wall aperture 48. Birds that are not alive when conveyed to the alignment stunner will not be able to move towards the first side of the conveyor, and thus will not be able to move into the hanging box. These dead birds can remain on the alignment conveyor until reaching the end on the alignment conveyor where they can be dropped off the conveyor into a container for disposal.

In one aspect, the opposed sides 40 of the hanging box 16 can move from the first side position, in which the opposed sides are substantially aligned with the first and second portions 28, 30 of the alignment box 26, to the second side position having a smaller distance between the opposed sides than the first position. In another aspect, the opposed sides of the hanging box can move from the first side position to the second side position as the bird is under the spray bar 36 of the alignment stunner, though it is contemplated that the opposed sides of the hanging box can move after the bird has passed under the spray bar. In one aspect, the second side position can be sized so that in the second side position, each of the opposed sides of the hanging box 16 contacts the body of the bird 44. For example, in the second side position, the opposed sides 40 can be about 6 inches apart from each other. Thus, the bird can be contacted by the opposed sides of the hanging box with at least a portion of the head of the bird extending through the rear wall aperture 48.

The bird can then be conveyed to a spray bar 36 configured to stun the bird. For example, the spray bar can be electrically coupled to a power source so that the spray directed towards the bird is electrified. In another example, the spray bar can spray cold or chilled fluid towards the bird in order to stun the bird. After the bird has been stunned, the means for immobilizing 42 the legs of the bird, such as the locking arms 50, can be moved from the first arm position to the second arm position, thereby holding the legs of the bird in place. The hanging box 16 can then articulate from the first box position to the second box position, in which the lower surface 38 of the hanging box 16 is at an acute angle relative to the plane of the alignment conveyor. After the bird has been immobilized, the lower surface of the hanging box 16 can rotate to the second surface position, wherein the legs of the bird can extend beyond edge of the sides 40 of the hanging box while the lower surface 38 does not extend beyond the edge of the opposed sides of the hanging box 16.

As can be appreciated, after the bird has been grasped by the hanging box, the hanging box can travel away from the alignment conveyor 12. As can also be appreciated, the steps to grasp the bird can be accomplished in other order than described above. For example, the means for immobilizing 42 the legs of the bird can move to the second arm position prior to stunning the bird. In another example, the hanging box 16 can articulate to the second box position prior to locking the legs of the bird.

The hanging box 16 with the bird grasped therein can be brought adjacent to the picking line 56. As illustrated in FIG. 1, in one aspect, the picking line and the hanging box can be brought adjacent to each other in an area where the at least one rail and/or chain 54 is curved. For example, an inner radius of the at least one rail and/or chain can be aligned with an outer radius of the picking line so that the hanging box 16 can be aligned with a shackle 18. By placing the picking line and the hanging box adjacent to each other in a curved area, different spacing between each hanging box and each shackle can be achieved. For example, the shackles can be spaced about 6 inches apart on the picking line, while the hanging boxes can be spaced about 12 inches apart.

Because the hanging box is in the second box position, the legs of the bird can be in a plane above the two inner members 62 of the shackle. Upon alignment of the hanging box 16 and the shackle 18, the hanging box can articulate towards the first box position, thereby lowering the legs of the bird into the central cavity 63 of the shackle. As the hanging box continues to articulate towards the first box position, each leg of the bird can be lowered into a respective slot 67 formed between the inner members 62 and the outer perimeter member 60 of the shackle 18. The opposed sides 40 of the hanging box can rotate toward the first side position and the means for immobilizing 42 the legs of the bird can be moved from the second arm position to the first arm position, thereby releasing the hanging box's grasp on the bird and hanging the bird in the shackle. The picking line can then transport the bird through the processing facility for conventional processing.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. An automated system for hanging poultry, comprising:
an alignment conveyor, wherein the alignment conveyor is an endless conveyor having an upper surface positioned in an alignment conveyor plane and movable in an alignment conveyor direction, wherein the alignment conveyor comprises at least one alignment box configured to receive poultry that defines a side opening, and wherein the at least one alignment box is attached to the upper surface of the alignment conveyor;
a hanging box comprising a lower surface, a pair of opposed sides, a rear wall defining a rear wall aperture, and a means for immobilizing the poultry, wherein the hanging box is rotatable about and between a first box position, in which the lower surface of the hanging box is substantially parallel to the plane of the alignment conveyor, and a second box position, in which the lower surface of the hanging box is at an acute angle relative to the plane of the alignment conveyor;
an alignment stunner comprising means for urging the poultry from the at least one alignment box through the side opening and to the hanging box when the hanging box is positioned above at least a portion of the upper surface of the alignment conveyor, the alignment stunner defining at least one fluid opening in fluid communication with a fluid source that is configured to direct at least a first stream of fluid in a desired direction towards the upper surface of the alignment conveyor; and
a shackle configured to grasp a portion of the poultry, the shackle being positioned in a picking line configured to carry the grasped poultry for further processing,
wherein the hanging box contacts the poultry and inserts the poultry into the shackle as the hanging box moves from the second box position to the first box position.

2. The automated system for hanging poultry of claim 1, wherein the alignment conveyor is configured to convey the poultry from an input point to the alignment stunner.

3. The automated system for hanging poultry of claim 1, wherein the alignment conveyor plane is substantially parallel to a floor on which the alignment conveyor is placed.

4. The automated system for hanging poultry of claim 1, wherein the alignment conveyor plane is positioned at an acute angle relative to a floor on which the alignment conveyor is placed.

5. The automated system for hanging poultry of claim 1, wherein the at least one alignment box comprises a first portion and a separate second portion, and wherein the first and second portions of the alignment box extend upwardly away from the conveyor plane of the alignment conveyor.

6. The automated system for hanging poultry of claim 1, wherein the alignment stunner comprises at least one spray bar, wherein the at least one fluid opening comprises a plurality of fluid openings defined in at least a portion of the at least one spray bar.

7. The automated system for hanging poultry of claim 6, wherein the at least one spray bar is an oscillating spray bar, capable of rotation about and between a first spray bar position, in which fluid exits the at least one spray bar in a first desired direction relative to the conveyor plane of the alignment conveyor, and a second spray bar position, in which fluid exits the at least one spray bar in a second desired direction that is different from the first desired direction.

8. The automated system for hanging poultry of claim 6, wherein the at least one spray bar comprises a plurality of spray bars, and wherein at least one spray bar of the plurality of spray bars is positioned at an acute angle relative to an alignment conveyor axis.

9. The automated system for hanging poultry of claim 8, wherein at least one spray bar of the plurality of spray bars is electrically coupled to a power source as described so that fluid exiting the at least one spray bar is electrified.

10. The automated system for hanging poultry of claim 8, wherein at least one spray bar of the plurality of spray bars is coupled to a source of chilled fluid so that fluid exiting the at least one spray bar is chilled.

11. The automated system for hanging poultry of claim 1, wherein the pair of opposed sides of the hanging box are movable relative to each other and extend away from the lower surface.

12. The automated system for hanging poultry of claim 11, wherein the pair of opposed sides are movable about and between a first side position, in which the pair of opposed sides are spaced from each other a first predetermined distance, and a second side position in which the pair of opposed sides are spaced from each other a second predetermined distance that is less than the first predetermined distance.

13. The automated system for hanging poultry of claim 1, wherein the means for immobilizing the poultry comprises a means for immobilizing the legs of the poultry.

14. The automated system for hanging poultry of claim 13, wherein the means for immobilizing the legs of the poultry comprises a pair of locking arms movable about and between a first arm position, in which at least a portion of each locking arm is positioned below the lower surface of the hanging box, and a second arm position in which at least a portion of each locking arm is positioned above the lower surface of the hanging box.

15. The automated system for hanging poultry of claim 14, wherein each arm of the pair of locking arms is substantially L-shaped.

16. The automated system for hanging poultry of claim 1, wherein the shackle comprises a central member and an outer perimeter member attached to a proximal end of the central member, wherein a distal end of the central member extends away from the perimeter member and is configured for attachment to the picking line, wherein the shackle further comprises two inner members spaced from the outer perimeter member and that cooperate with the outer perimeter member to create a pair of slots sized to receive a portion of the poultry.

17. The automated system for hanging poultry of claim 1, wherein the hanging box has a hanging box axis that is substantially coaxially aligned with an alignment box axis of the alignment box for a predetermined distance as the alignment box travels in the alignment conveyor direction.

18. The automated system for hanging poultry of claim 1, further comprising a control system coupled to at least one sensor.

19. The automated system for hanging poultry of claim 18, wherein the at least one sensor is configured to sense the presence of the poultry at a predetermined position in the system.

20. The automated system for hanging poultry of claim 19, wherein the at least one sensor is configured to sense the presence of the poultry in the alignment box, and wherein the control system selectively adjusts a speed of the alignment conveyor based at least in part upon the presence of the poultry.

* * * * *